(12) United States Patent
Wang et al.

(10) Patent No.: US 7,695,646 B2
(45) Date of Patent: Apr. 13, 2010

(54) COMPOSITE MATERIAL WITH ELECTROMAGNETICALLY REACTIVE CELLS AND QUANTUM DOTS

(75) Inventors: Shih-Yuan Wang, Palo Alto, CA (US); Alexandre Bratkovski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 683 days.

(21) Appl. No.: 11/285,910

(22) Filed: Nov. 23, 2005

(65) Prior Publication Data

US 2007/0114431 A1   May 24, 2007

(51) Int. Cl.
*G02B 13/18* (2006.01)
*H01B 3/24* (2006.01)
*H01B 1/00* (2006.01)

(52) U.S. Cl. .................. 252/501.1; 252/500; 252/518.1; 359/719; 343/909; 977/700; 977/707; 977/720; 977/759; 977/761; 977/774; 977/778

(58) Field of Classification Search .................. 252/500, 252/501.1, 518.1; 343/909; 359/719; 977/700, 977/707, 720, 759, 761, 774, 778
See application file for complete search history.

(56) References Cited

U.S. PATENT DOCUMENTS

| 6,661,392 | B2 | 12/2003 | Isaacs et al. |
| 6,791,432 | B2 | 9/2004 | Smith et al. |
| 6,859,114 | B2 | 2/2005 | Eleftheriades et al. |
| 6,938,325 | B2 | 9/2005 | Tanielian |
| 2003/0155919 | A1 | 8/2003 | Pendry et al. |
| 2005/0073744 | A1 | 4/2005 | Zheludev et al. |
| 2005/0146402 | A1 | 7/2005 | Sarabandi et al. |
| 2005/0199870 | A1 | 9/2005 | Gray et al. |
| 2005/0200540 | A1 | 9/2005 | Isaacs et al. |
| 2006/0257090 | A1* | 11/2006 | Podolskiy et al. ........... 385/129 |

FOREIGN PATENT DOCUMENTS

| WO | WO 2004/021086 A2 | 3/2004 |
| WO | WO 2005/024952 A2 | 4/2005 |
| WO | WO 2005/036222 A1 | 4/2005 |
| WO | WO 2005/036224 A1 | 4/2005 |

OTHER PUBLICATIONS

Redl et al. "Three-dimensional binary superlattices of magnetic nanocrystals and semiconductor quantum dots." Nature, vol. 423, pp. 968-971, Jun. 2003.*

Ramakrishna, S., "Removal of Absorption and Increase in Resolution In a Near-Field Lens Via Optical Gain," Physical Review B 67, 201101(r), pp. 1-4 (2003).

(Continued)

*Primary Examiner*—Mark Kopec
*Assistant Examiner*—Tri V Nguyen

(57) ABSTRACT

A composite material and related methods are described, the composite material configured to exhibit at least one of a negative effective permittivity and a negative effective permeability for incident radiation of at least one wavelength. The composite material comprises an arrangement of electromagnetically reactive cells of small dimension relative to the wavelength, each cell having a plurality of quantum dots associated therewith for enhancing a resonant response thereof to the incident radiation at the wavelength.

19 Claims, 4 Drawing Sheets

OTHER PUBLICATIONS

Smith, D., et. al., "Metamaterials and Negative Refractive Index," Science, vol. 305 pp. 788-792 (Aug. 6, 2004).

Yen, T.J. et. al., "Terahertz Magnetic Response from Artificial Materials," Science, vol. 303 pp. 1494-1496 (Mar. 5, 2004).

Emanuelson, J., "An Introduction to the New Oxide Superconductors," Colorado Futurescience, Inc. (1999), downloaded from http://www.futurescience.com/scintro.html on Oct. 28, 2005.

* cited by examiner

COMPOSITE MATERIAL WITH ELECTROMAGNETICALLY REACTIVE CELLS AND QUANTUM DOTS

FIELD

This patent specification relates generally to the propagation of electromagnetic radiation and, more particularly, to composite materials capable of exhibiting negative effective permeability and/or negative effective permittivity with respect to incident electromagnetic radiation.

BACKGROUND

Substantial attention has been directed in recent years toward composite materials capable of exhibiting negative effective permeability and/or negative effective permittivity with respect to incident electromagnetic radiation. Such materials, often interchangeably termed artificial materials or metamaterials, generally comprise periodic arrays of electromagnetically resonant cells that are of substantially small dimension (e.g., 20% or less) compared to the wavelength of the incident radiation. Although the individual response of any particular cell to an incident wavefront can be quite complicated, the aggregate response the resonant cells can be described macroscopically, as if the composite material were a continuous material, except that the permeability term is replaced by an effective permeability and the permittivity term is replaced by an effective permittivity. However, unlike continuous materials, the resonant cells have structures that can be manipulated to vary their magnetic and electrical properties, such that different ranges of effective permeability and/or effective permittivity can be achieved across various useful radiation wavelengths.

Of particular appeal are so-called negative index materials, often interchangeably termed left-handed materials or negatively refractive materials, in which the effective permeability and effective permittivity are simultaneously negative for one or more wavelengths depending on the size, structure, and arrangement of the resonant cells. Potential industrial applicabilities for negative-index materials include so-called superlenses having the ability to image far below the diffraction limit to $\lambda/6$ and beyond, new designs for airborne radar, high resolution nuclear magnetic resonance (NMR) systems for medical imaging, and microwave lenses.

One issue that arises in the realization of useful devices from such composite materials, including negative index materials, relates to substantial losses experienced by the incident electromagnetic signal when propagating through the composite material. Accordingly, it would be desirable to reduce signal losses in such composite materials. It would be further desirable to provide a general approach to reducing such losses that can be applied to a variety of composite materials operating across a variety of different spectral ranges.

SUMMARY

In accordance with an embodiment, a composite material is provided that is configured to exhibit at least one of a negative effective permittivity and a negative effective permeability for incident radiation of at least one wavelength. The composite material comprises an arrangement of electromagnetically reactive cells of small dimension relative to the wavelength, each cell having a plurality of quantum dots associated therewith for enhancing a resonant response thereof to the incident radiation at the wavelength.

Also provided is a method for propagating electromagnetic radiation at a propagating wavelength. A composite material is placed in the path of the electromagnetic radiation, the composite material comprising resonant cells of small dimension relative to the propagating wavelength, the resonant cells being configured such that the composite material exhibits at least one of a negative effective permittivity and a negative effective permeability for the propagating wavelength. Power is provided to a plurality of quantum dots associated with the resonant cells, at least a portion of that power being coupled into a resonant response of the resonant cells for reducing net losses in the electromagnetic radiation propagating therethrough.

Also provided is an apparatus configured to exhibit at least one of a negative effective permittivity and a negative effective permeability for electromagnetic radiation of at least one wavelength. The apparatus comprises an arrangement of resonant cells, each resonant cell being of small dimension relative to the wavelength. The apparatus further comprises means for reducing net losses in the electromagnetic radiation propagating through the resonant cells, the means for reducing net losses comprising a plurality of quantum dots associated with each resonant cell.

DETAILED DESCRIPTION

Figure 1:
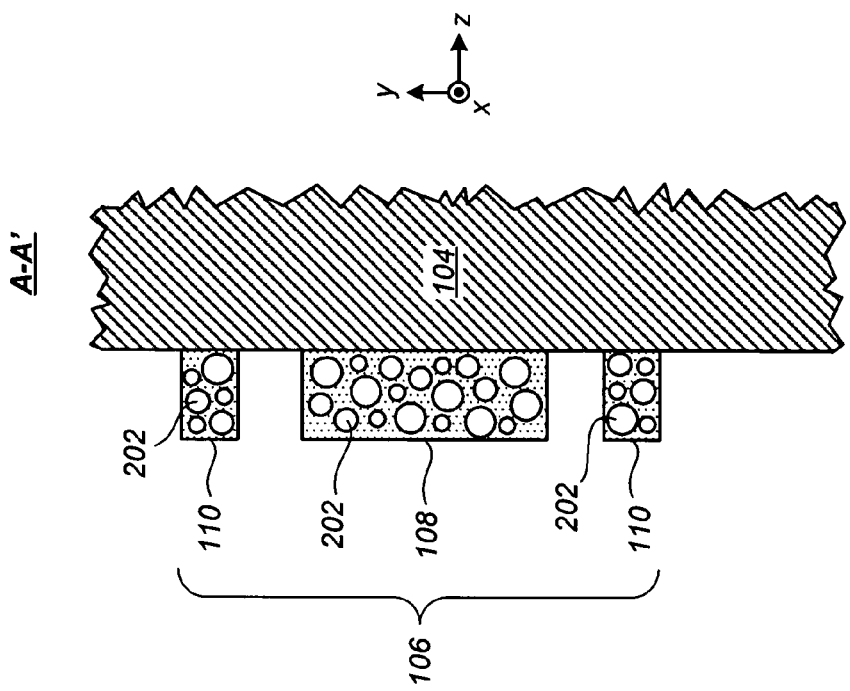
FIG. 1 illustrates a perspective view of a composite material according to an embodiment.

FIG. 1 illustrates a perspective view of a composite material 100 according to an embodiment. Composite material 100 comprises one or more planar arrays 102, each formed upon a backplane 104, which can be a semiconductor substrate. Each planar array 102 comprises an arrangement of resonant cells 106, each having a dimension that is small (e.g., 20 percent or less) than an operating wavelength. As used herein, operating wavelength refers to a wavelength or range of wavelengths of incident radiation 101 for which negative effective permittivity and/or negative effective permeability are to be exhibited in the composite material 100. Thus, by way of non-limiting example, where the desired operating wavelength lies in the mid-infrared region near 10 μm, the dimension of each resonant cell 106 should be less than about 2 μm, with better performance being exhibited where that dimension is about 1 μm or less. By way of another non-limiting example, where the desired operating wavelength lies in the near-infrared region near 1550 nm, the dimension of each resonant cell 106 should be less than about 310 nm, with better performance being exhibited where that dimension is about 155 nm or less. It is to be understood that references to operating wavelengths herein generally refer to free space wavelengths, and that dimensions in the context of operating wavelength on a substrate are to be scaled, as appropriate, according to the refractive index of the substrate at the operating wavelength.

It is to be appreciated that FIG. 1 represents a simplified example for clarity of description, showing only a single set of planar arrays 102 aligned along a direction of propagation of the incident radiation 101. In other embodiments a second set of planar arrays can be provided perpendicular to the first set of planar arrays 102 for facilitating negative effective permittivity and/or negative effective permeability for more directions of propagation. In still other embodiments, a third set of planar arrays can be provided perpendicular to both the first set and second sets of planar arrays for facilitating negative effective permittivity and/or negative effective permeability for even more directions of propagation.

It is to be further appreciated that one or more additional sets of composite and/or continuous-material planes can be placed between the planar arrays 102 without departing from the scope of the present teachings. By way of example, planar arrays comprising vertical conducting wires on a dielectric support structure can be interwoven with planar arrays 102 to provide a more negative effective permittivity for the overall composite material 100. It is to be further appreciated that the number of resonant cells 106 on the planar arrays 102 can be in the hundreds, thousands, or beyond depending on the overall desired dimensions and the desired operating wavelength.

As illustrated in FIG. 1, each resonant cell 106 comprises electrical conductors 108 and 110 patterned to have both capacitive and inductive properties and being designed to interact in a resonant manner with incident radiation at the operating wavelength. In the particular example of FIG. 1 the conducting material is formed into a square split ring resonator pattern, but other patterns can be used including, for example, circular split ring resonator patterns, swiss roll patterns, or other patterns exhibiting analogous properties. Also shown in FIG. 1 is a pump light source 113 that, according to one embodiment, provides optical pump radiation for a plurality of quantum dots associated with each resonant cell 106, the quantum dots being selected, configured, and positioned such that a resonant response of the resonant cells to the incident radiation are enhanced at the operating wavelength. Losses in the propagating radiation are reduced by virtue of a coupling of the externally provided power into the response of the resonant cells 106 by operation of the quantum dots. In one embodiment consistent with that of FIG. 1, the quantum dots are optically pumped by the pump light source 113. In other embodiments the quantum dots associated with the resonant cells are electrically pumped.

Figure 2:
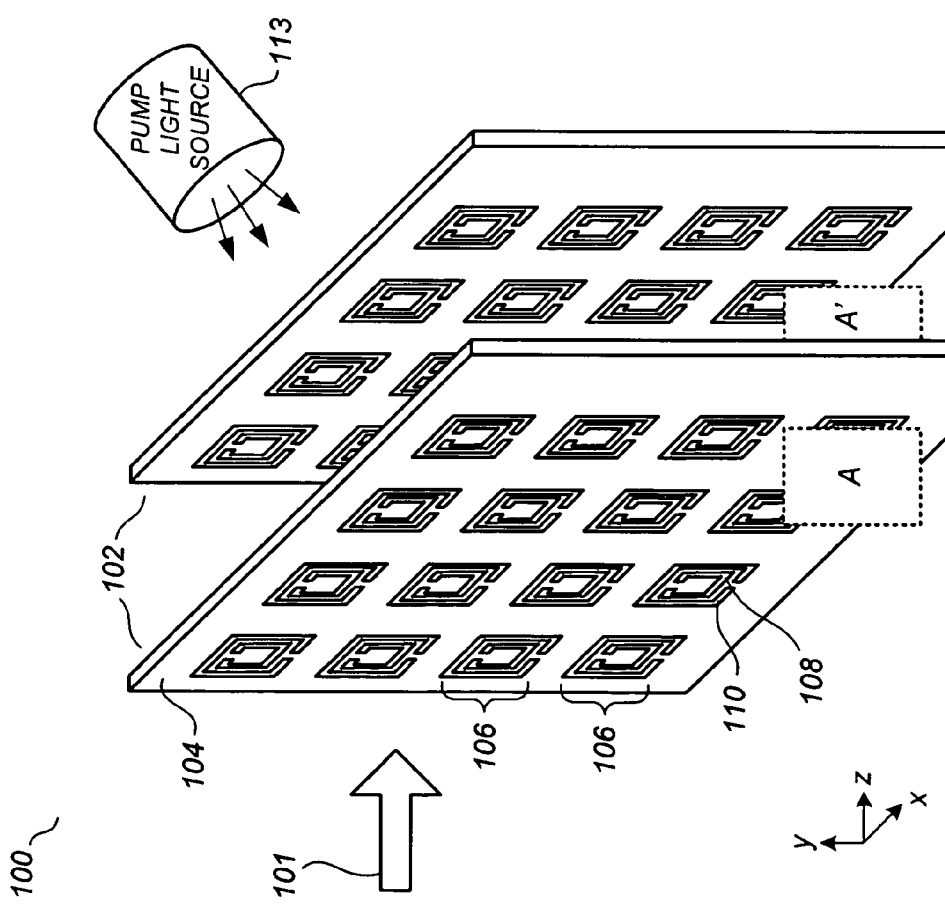
FIG. 2 illustrates a side cut-away view of a composite material according to an embodiment.

FIG. 2 illustrates a side cut-away view of a resonant cell 106 of the composite material 100 of FIG. 1 corresponding to an exemplary cut plane A-A' shown in FIG. 1. In particular, FIG. 2 illustrates a cross-section along a vertically oriented side edge of the electrical conductor 108 and the horizontally oriented top and bottom edges of the electrical conductor 110. In accordance with one embodiment, a plurality of quantum dots 202 are integrated into the electrical conductors 110 for enhancing a resonant response of the resonant cell 106 to the incident radiation at the operating wavelength to thereby reduce losses in the propagating radiation. The particular cross-sectional dimensions of the electrical conductors 108 and 110 and the quantum dots 202 are exaggerated for purposes of clarity, and it is to be understood that a variety of different dimensional relationships between and among the electrical conductor dimensions and the quantum dots 202 are within the scope of the present teachings.

Quantum dots comprise small particles of inorganic semiconductor material and have one or more properties that are advantageously used in conjunction with one or more of the embodiments. Depending on their particular size, material makeup, and surface properties, populations of quantum dots can be optically and/or electrically pumped to absorb energy and then can re-emit that energy spontaneously and/or in phase with a traveling wave. As such, quantum dots have been found useful for a variety of devices including, but not limited to, semiconductor lasers and optical amplifiers.

For one embodiment, the sizes, material makeup, and surface properties of the quantum dots 202 are selected such that, as a population, they absorb radiation in a first frequency range and emit radiation in a second frequency range, the first frequency range being associated with pump radiation provided by the pump light source 113 and the second frequency range being associated with the operating frequency of the propagating radiation. In this manner, the quantum dots 202 are energized by the pump radiation and serve to reinforce the propagating radiation as it propagates through the composite material 100. Photons in the first frequency range should, of course, have higher energies (shorter wavelength) than photons in the second frequency range. In one non-limiting example, the quantum dots 202 are provided in different sizes including a smaller size and a larger size, the smaller size quantum dots absorbing the pump radiation in the first (higher) frequency range, the larger size quantum dots emitting radiation at the operating frequency in the second (lower) frequency range upon transfer of the excitation from the smaller size quantum dots to the larger size quantum dots.

By way of example and not by way of limitation, the first frequency range may correspond to free space wavelengths in the range of 400 nm-1400 nm, while the second frequency range may correspond to free space wavelengths in the range of 1535-1565 nm. In other embodiments, the quantum dots 202 may be configured to yield a substantially broader optical gain spectrum such the second frequency range is substantially wider, for example, corresponding to free space wavelengths between 1400-1600 nm.

Quantum dots 202 can have any of a variety of shapes and dimensions, with typical maximum dimensions (e.g., diameter of a globular shape or longest end-to-end distance of an oblong shape) being between 1 nm and 100 nm. The quantum dots can be formed from any of a variety of different materials known to achieve optical and/or electro-optical characteristics consistent with those described herein. Several different quantum dot fabrication methods are known and continue to be improved, and, accordingly, quantum dots having optical absorption, optical emission, and/or electrical properties consistent with the present teachings could be obtained by a person skilled in the art without undue experimentation in view of the present disclosure. Depending on the particular desired properties, the population of quantum dots 202 may be uniformly sized or may comprise distributions of two or more different sizes. For shapes that are not spherically symmetric, a distribution of orientations can result in an effective broadening of the size distribution as seen by incident light. For one embodiment, the preferred quantum dot shape is spherical to avoid the need for orientation of quantum dots within the electrical conductors 108 and/or 110.

In one embodiment, the quantum dots 202 are fabricated as self-assembled structures in a III-V materials system, with examples of group III elements including Al, Ga and In, and with examples of group V elements being N, P, As and Sb. Thus, by way of example and not by way of limitation, the quantum dots 202 may comprise one or more of GaAs, GaN, InP, and InAs. In another embodiment, the quantum dots may comprise II-VI materials, with examples including CdSe, CdS, ZnS, ZnO, and ZnSe. Quantum dots from still other materials systems, such as diamond, may alternatively be used. Any of a variety of crystal growth techniques may alternatively be used for quantum dot fabrication. Examples of suitable growth techniques include, but are not limited to, metallo-organic chemical vapor deposition (MOCVD), molecular beam epitaxy (MBE), and gas source MBE (GSMBE).

In one embodiment, the material for the electrical conductors 108/110 (i.e., those portions not occupied by the quantum dots 202) comprises a metal, such as gold or silver. In another embodiment, the electrical conductors 108/110 comprise a ceramic oxide material cooled to a highly conductive or superconductive state. An example of the latter is $YBa_2Cu_3O_7$. Quantum dots may be mixed in, for example, with the chemical precursors to $YBa_2Cu_3O_7$ when they are in powder form before a firing step in the fabrication thereof. Generally speaking, because the electrical conductors 108/110 will generally be of small thickness compared to the wavelengths of the pump radiation and the propagating radiation, the conductive material surrounding the quantum dots 202 will not substantially impede their exposure to the radiation and their consequent advantageous effects.

Figure 3:
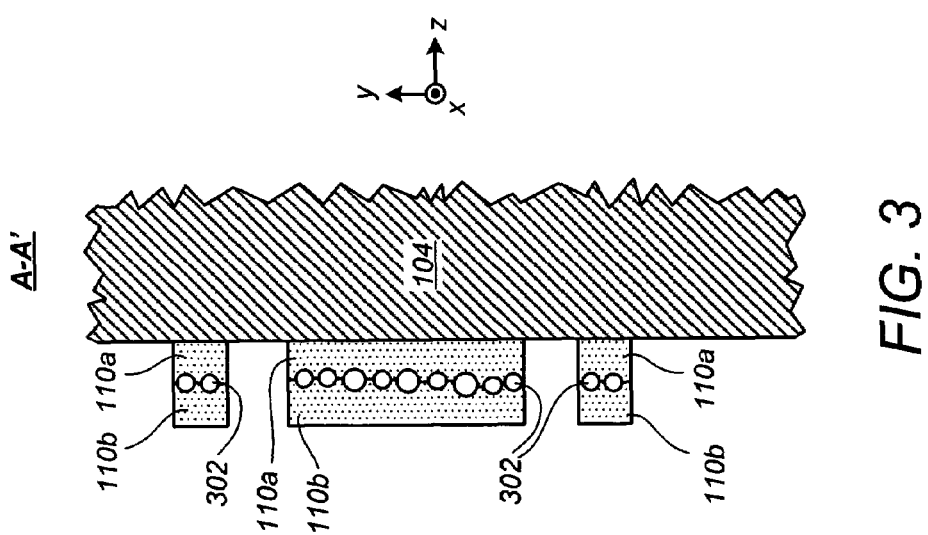
FIG. 3 illustrates a side cut-away view of a composite material according to an embodiment.

FIG. 3 illustrates a side cut-away view of a resonant cell of a composite material according to an embodiment. In this example quantum dots 302 are disposed on a monolayer over a first electrical conductor film 110a and covered by a second electrical conductor film 110b. In at least some circumstances, the embodiment of FIG. 3 may be easier to fabricate when the desired quantum dots are difficult to integrate into a metallic electrical conductor. However, the scope of the present teachings is not so limited, and in other embodiments either or both of the electrical conductor films 110a/110b may comprise a superconductive ceramic oxide material. In other embodiments, multiple layers of quantum dots may be disposed between the electrical conductor films 110a/110b.

Figure 4:
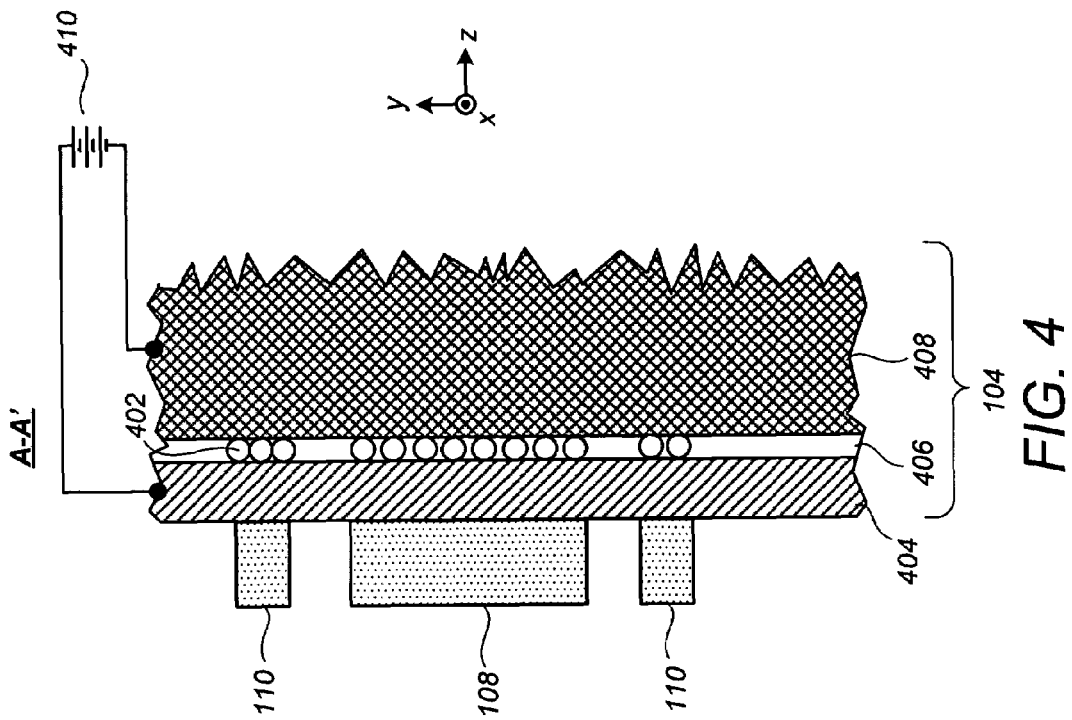
FIG. 4 illustrates a side cut-away view of a composite material according to an embodiment.

FIG. 4 illustrates a side cut-away view of a resonant cell of a composite material according to an embodiment in which electrical conductors 108 and 110 do not contain quantum dots, but rather a plurality of quantum dots 402 are contained in one or more layers of the backplane 104. More particularly, the backplane 104 comprises a plurality of semiconductor layers including a first layer 404 having a first type of conductivity (e.g., p-type or n-type), a second layer 408 having a second type of conductivity (e.g., n-type or p-type, respectively), and an intermediate layer 406 therebetween, the quantum dots 402 being disposed in the intermediate layer 406 in a spatial pattern corresponding to the electrical conductor pattern, e.g., at spatial locations lying directly under the electrical conductors 108/110, as illustrated in FIG. 4.

The semiconductor layers 404, 406, and 408 can be selected from any of a variety of III-V semiconductor material systems including, but not limited to, InP or GaAs. The intermediate layer 406 is preferably undoped. An electrical pump current provided by an external power source 410 flows from the first layer 404 to the second layer 408 and pumps the quantum dots 402. The bandgap of the semiconductor material should be higher than the bandgap of the quantum dots 402. Preferably, the first layer 406 is thin enough to provide sufficiently close proximity between the electrical conductors 108/110 and the quantum dots 402. In yet another embodiment, quantum dots are provided in both the electrical conductors 108/110 and in the intermediate layer 406.

Figure 5:
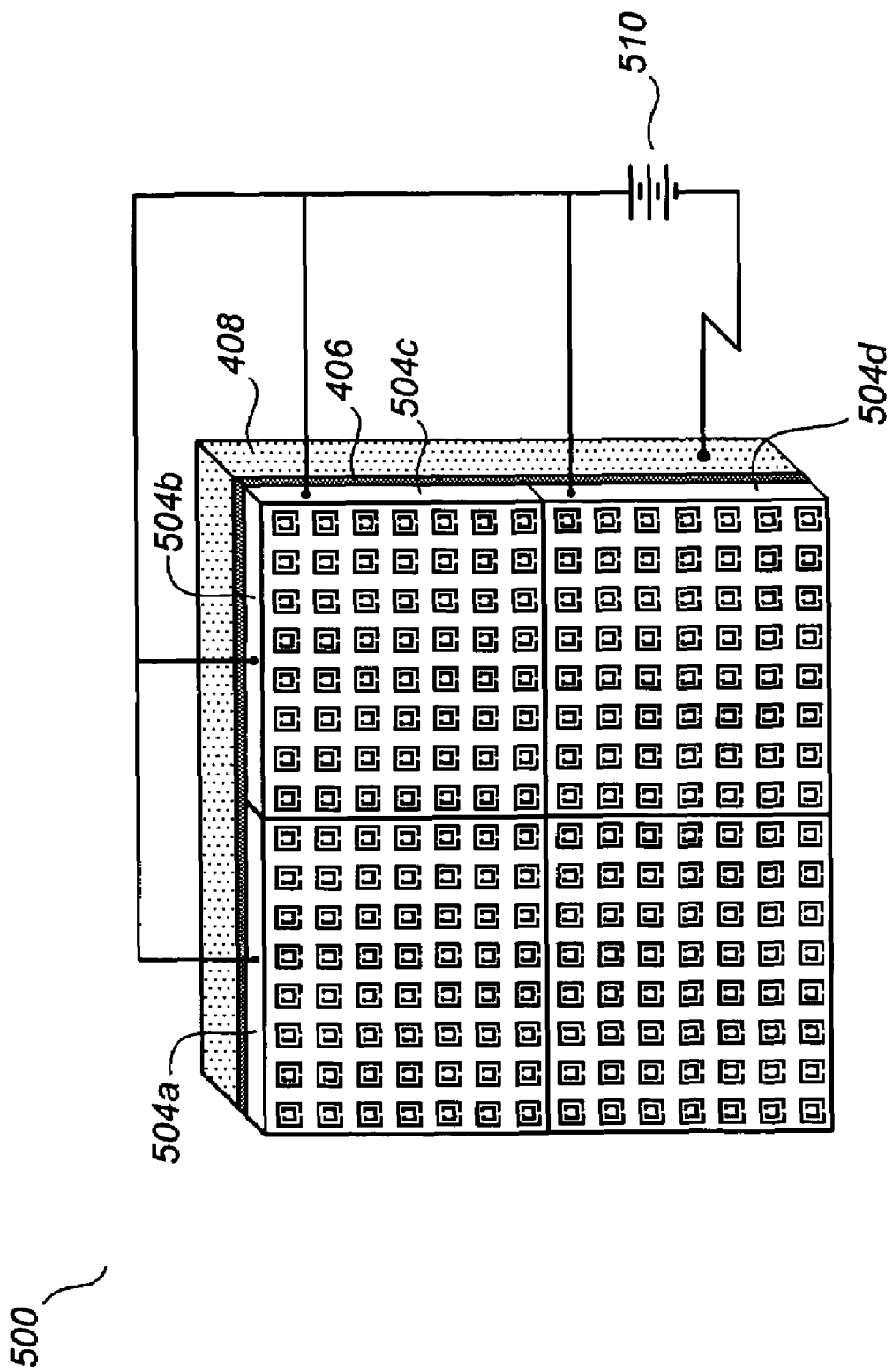
FIG. 5 illustrates a perspective view of a composite material according to an embodiment.

FIG. 5 illustrates a side cut-away view of a composite material 500 according to an embodiment designed to maintain the long-term negative permittivity and/or negative permeability characteristics while also providing adequate electrical power to the quantum dots. Providing individual electrical conductors to carry pump current to each particular resonant cell could substantially disturb one or both of the negative permittivity and negative permeability characteristics. According to an embodiment, the first semiconductor layer 406 (see FIG. 4, supra) is segmented into a plurality of electrically distinct regions 504a, 504b, 504c, and 504d having lateral dimensions greater than the wavelength of the radiation. Accordingly, the distinct regions 504a, 504b, 504c, and 504d are rather large relative to the size of any particular resonant cell. An electrical current from an external source 510 is provided on a per-region basis for electrically pumping the quantum dots in the intermediate layer 406. It is to be appreciated that there may be tens, hundreds, or thousands of the distinct regions. In such cases, electrical lines carrying the necessary pump current can run along the backplane along "seams" dividing the distinct regions, or may alternatively be or irregularly or randomly placed. However, because the electrical conductors will be relatively sparse compared to the resonant cell size, the interactions among nearby resonant cells is not substantially disturbed. In this manner, sufficient pump current is provided to the quantum dots while maintaining the desired negative effective permittivity and/or negative effective permeability characteristics of the composite material 500.

Figure 6:
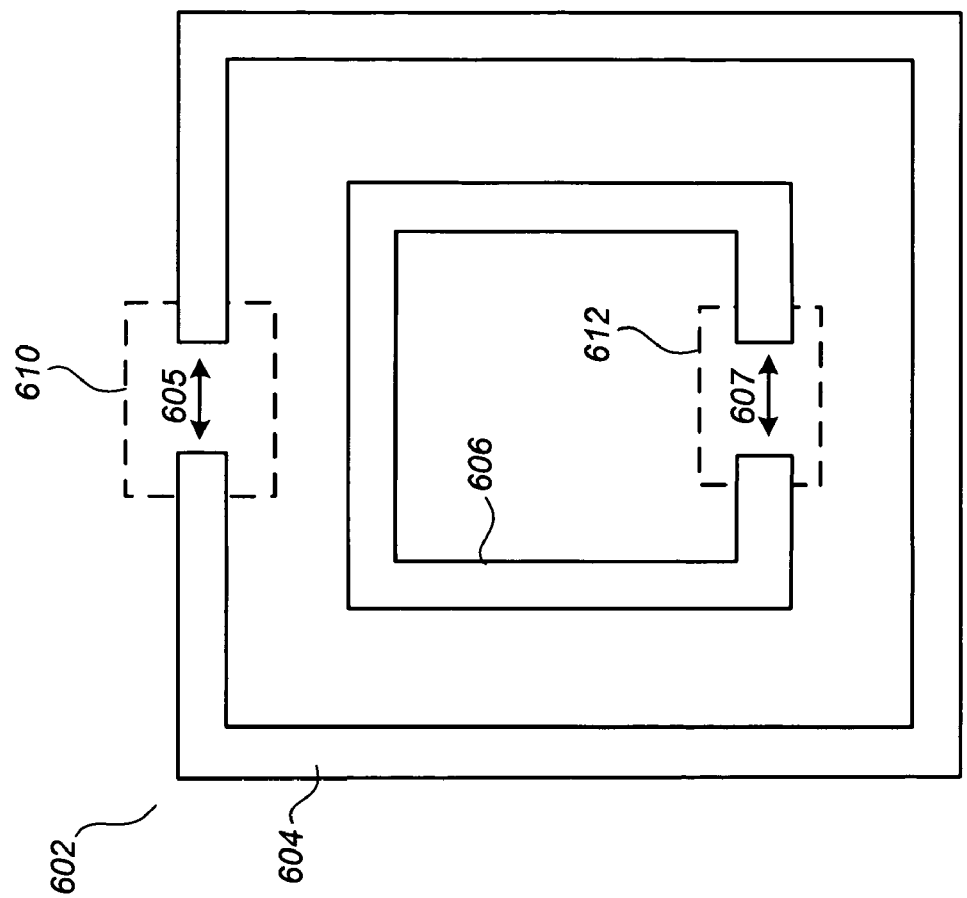
FIG. 6 illustrates a front view of a resonant cell of a composite material according to an embodiment.

FIG. 6 illustrates a front view of a resonant cell 602 of a composite material according to an embodiment, comprising electrically conductive split-ring resonators 604 and 606 having split-ring resonator gaps 605 and 607, respectively. Quantum dots are contained in one of the underlying semiconductor layers in a manner similar to that of FIG. 4, supra. However, for the embodiment of FIG. 6, the quantum dots are maintained in regions 610 and 612 beneath and immediately surrounding the gaps 605 and 607, respectively, for enhancement of the resonant response of the resonant cell 602 to the incident radiation at the operating wavelength.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of negative-index materials, the features and advantages of the embodiments are readily applicable in the context of other composite materials. Examples include so-called indefinite materials in which the permeability and permittivity are of opposite signs. By way of further example, the quantum-dot powered resonant cells can be implemented on only a portion of a larger composite material, or with a subset of the possible directions of an anisotropic composite material, or interleaved in one or more directions with a continuous material as part of a larger composite material, without departing from the scope of the embodiments. By way of still further example, various parameters and/or dimensions of the composite material layers, or additional layers of composite or continuous materials, can be modulated in real-time or near-real time without departing from the scope of the embodiments. Thus, reference to the details of the described embodiments are not intended to limit their scope.

What is claimed is:

1. A composite material configured to exhibit at least one of a negative effective permittivity and a negative effective permeability for incident radiation of at least one wavelength, the composite material comprising an arrangement of electromagnetically resonant cells having smaller dimension relative to said wavelength, each cell having a plurality of quantum dots, each of the electromagnetically resonant cells comprising an electrical conductor, wherein the quantum dots are integrated into the electrical conductor for enhancing a resonant response thereof to the incident radiation at said wavelength.

2. The composite material of claim 1, wherein said electrical conductor comprises a metal, and wherein said quantum dots are integrated into said metal.

3. The composite material of claim 1, wherein said electrical conductor comprises a plurality of metallic layers, and wherein said quantum dots are positioned between said metallic layers.

4. The composite material of claim 1, wherein said electrical conductor comprises a ceramic oxide material, and wherein said quantum dots are integrated into said ceramic oxide material.

5. The composite material of claim 1, wherein said quantum dots are externally powered using one of electrical pumping and optical pumping.

6. The composite material of claim 1, each of said electromagnetically resonant cells comprising an electrical conductor, wherein at least a portion of said quantum dots are positioned near said electrical conductor.

7. The composite material of claim 6, said electrical conductor being arranged in a split-ring resonator pattern, wherein said quantum dots are positioned near a gap of said split-ring resonator pattern.

8. The composite material of claim 6, said electrical conductor being formed on a backplane comprising a plurality of semiconductor layers, wherein said quantum dots are positioned in one or more of said semiconductor layers.

9. The composite material of claim 8, said semiconductor layers including a first layer having a first type of conductivity, a second layer having a second type of conductivity, and an intermediate layer positioned between said first and second layers, said quantum dots being positioned in said intermediate layer and being electrically pumped by an electrical current flowing between said first and second layers through said intermediate layer.

10. The composite material of claim 9, wherein said first layer is segmented into a plurality of electrically distinct regions having lateral dimensions greater than said wavelength of said incident radiation, the electrical current being provided on a per-region basis for electrically pumping said quantum dots while also maintaining said at least one of the negative effective permittivity and negative effective permeability.

11. A method for propagating electromagnetic radiation at a propagating wavelength, comprising:
  placing a composite material in the path of the electromagnetic radiation, the composite material comprising resonant cells having smaller dimension relative to the propagating wavelength, each of said resonant cells comprising an electrical conductor and being configured such that the composite material exhibits at least one of a negative effective permittivity and a negative effective permeability for said propagating wavelength; and
  providing power to a plurality of quantum dots integrated into said electrical conductor, at least a portion of that power being coupled into a resonant response of said resonant cells for reducing net losses in the electromagnetic radiation propagating therethrough.

12. The method of claim 11, wherein said providing power comprises optically pumping said quantum dots using pump radiation having a wavelength different than said propagating wavelength.

13. The method of claim 11, wherein said providing power comprises electrically pumping said quantum dots.

14. The method of claim 11, wherein said electrical conductor comprises at least two layers, each layer comprising one of a metal and a ceramic oxide conductor, and wherein said quantum dots are disposed in a monolayer between an adjacent pair of said at least two layers.

15. The method of claim 11, each of said resonant cells comprising an electrical conductor, at least a portion of the quantum dots associated with each resonant cell being positioned near said electrical conductor.

16. The method of claim 15, said electrical conductor being arranged in a split-ring resonator pattern, wherein said quantum dots are positioned near a gap of said split-ring resonator pattern.

17. The method of claim 15, said electrical conductor being formed on a backplane comprising a plurality of semiconductor layers, wherein said quantum dots are positioned in one or more of said semiconductor layers.

18. The method of claim 17, said semiconductor layers including a first layer having a first type of conductivity, a second layer having a second type of conductivity, and an intermediate layer positioned between said first and second layers, said quantum dots being positioned in said intermediate layer, wherein said providing power comprises providing an electrical current that flows between said first and second layers through said intermediate layer.

19. The method of claim 18, wherein said first layer is segmented into a plurality of electrically distinct regions having lateral dimensions greater than said propagating wavelength, wherein said electrical current is provided on a per-region basis for electrically pumping said quantum dots while also maintaining said at least one of the negative effective permittivity and negative effective permeability.

* * * * *